(12) United States Patent
Neubacher et al.

(10) Patent No.: US 8,560,327 B2
(45) Date of Patent: Oct. 15, 2013

(54) SYSTEM AND METHOD FOR SYNCHRONIZING SOUND AND MANUALLY TRANSCRIBED TEXT

(75) Inventors: Andreas Neubacher, Vienna (AT); Miklos Papai, Budapest (HU)

(73) Assignee: Nuance Communications, Inc., Burlington, MA (US)

( * ) Notice: Subject to any disclaimer, the term of this patent is extended or adjusted under 35 U.S.C. 154(b) by 739 days.

(21) Appl. No.: 12/064,646

(22) PCT Filed: Aug. 18, 2006

(86) PCT No.: PCT/IB2006/052865
§ 371 (c)(1),
(2), (4) Date: Feb. 25, 2008

(87) PCT Pub. No.: WO2007/023436
PCT Pub. Date: Mar. 1, 2007

(65) Prior Publication Data
US 2008/0195370 A1    Aug. 14, 2008

(30) Foreign Application Priority Data
Aug. 26, 2005 (EP) .................................... 05107861

(51) Int. Cl.
*G10L 11/00* (2006.01)
(52) U.S. Cl.
USPC ........... 704/278; 704/231; 704/237; 704/246; 704/247
(58) Field of Classification Search
None
See application file for complete search history.

(56) References Cited

U.S. PATENT DOCUMENTS

| | | | |
|---|---|---|---|
| 6,260,011 B1* | 7/2001 | Heckerman et al. | 704/235 |
| 6,282,510 B1 | 8/2001 | Bennett et al. | |
| 6,338,038 B1* | 1/2002 | Hanson | 704/500 |
| 6,360,237 B1* | 3/2002 | Schulz et al. | 715/255 |
| 6,636,238 B1* | 10/2003 | Amir et al. | 715/730 |
| 7,010,489 B1* | 3/2006 | Lewis et al. | 704/260 |
| 7,058,889 B2* | 6/2006 | Trovato et al. | 715/716 |
| 2002/0010916 A1 | 1/2002 | Thong et al. | |
| 2002/0049595 A1* | 4/2002 | Bennett et al. | 704/260 |
| 2002/0143534 A1 | 10/2002 | Hol | |
| 2002/0163533 A1* | 11/2002 | Trovato et al. | 345/728 |
| 2004/0006481 A1 | 1/2004 | Kiecza et al. | |
| 2004/0111265 A1 | 6/2004 | Forbes | |
| 2004/0138894 A1 | 7/2004 | Kiecza et al. | |

OTHER PUBLICATIONS

David Bainbridge, et al: Making Oral History Accessible Over the World Wide Web, History and Computing, vol. 10, No. 1-3, 1998, pp. 73-81.
Office Action dated Sep. 8, 2010 from corresponding Chinese patent application No. 200680031279.3.

\* cited by examiner

*Primary Examiner* — Leonard Saint Cyr
(74) *Attorney, Agent, or Firm* — Wolf, Greenfield & Sacks, P.C.

(57) ABSTRACT

A method for synchronizing sound data and text data, said text data being obtained by manual transcription of said sound data during playback of the latter. The proposed method comprises the steps of repeatedly querying said sound data and said text data to obtain a current time position corresponding to a currently played sound datum and a currently transcribed text datum, respectively, correcting said current time position by applying a time correction value in accordance with a transcription delay, and generating at least one association datum indicative of a synchronization association between said corrected time position and said currently transcribed text datum. Thus, the proposed method achieves cost-effective synchronization of sound and text in connection with the manual transcription of sound data.

16 Claims, 5 Drawing Sheets

BEoF

...

"IS␣"
<TP6'>
"IS␣A"
<TP7'>
"N␣E"
<TP8'>
"XAMP"
<TP9'>
"LE."
<TPX'>

...

EoF

FIG. 3

SYSTEM AND METHOD FOR SYNCHRONIZING SOUND AND MANUALLY TRANSCRIBED TEXT

TECHNICAL FIELD OF THE INVENTION

The present invention relates generally to manual transcription of sound, in particular human speech. More specifically, the present invention relates to synchronization of sound data and text data, the text data being obtained by manual transcription of the sound data during playback of the latter, in view of subsequent synchronous playback of sound and text data, e.g. for correction purposes.

BACKGROUND OF THE INVENTION

When sound, e.g. human speech, is transcribed to text automatically by means of a speech recognition system, it is generally and easily possible to associate each word or even smaller lexical subunit, referred to as a text datum in the following, with the corresponding sound segment (also referred to as a sound datum), for instance by automatically including timing data derived from the sound data in the text file which is produced by the speech recognition system. The timing data can then be used to directly access a text datum corresponding to a given sound datum, and vice versa. Such an association is in particular required for commonly known features such as synchronous playback, wherein a segment of text (text datum) such as a word or a syllable corresponding to a currently played sound segment is shown to a user, for instance by highlighting the text segment in question on a display. Such a feature is especially useful for correction of transcriptions established through speech recognition as well as for review and quality assurance.

However, when sound is transcribed manually, which is the case frequently due to the well-known imperfections of current speech recognition systems, e.g. when dealing with sound data of poor quality or a highly specialized jargon, such an association is generally not available automatically. Therefore, in the prior art synchronization of text and sound has to be done manually by marking sound segments with a precision of the order of a few milliseconds and subsequent entering the corresponding text. Such an approach is very time consuming, thus representing an important matter of expenses. Nevertheless, it constitutes an important feature of transcription for further analysis, e.g. in the field of psychology, marketing, etc. A similar approach has been published by Bainbridge, D., and Cunningham, S. J.: "Making oral history accessible over the World Wide Web", History and Computing, vol. 10, no. 1-3, pp. 73-81 (1998).

Thus, there is a need in the art to be able to cost-effectively synchronize sound and text in connection with the manual transcription of sound data.

It is the object of the present invention to provide a method for synchronizing sound data and text data, said text data being obtained by manual transcription of said sound data during playback of the latter, which obviates the above-mentioned disadvantages. It is also an object of the present invention to provide a method for synchronized playback of sound data and corresponding text data, which incorporates the inventive method for synchronizing sound data and text data, thus obviating the common disadvantage of the prior art of synchronous playback being exclusively reserved to systems using speech recognition. Furthermore, the present invention has for its object to provide a system adapted to translate into action the respective inventive methods mentioned above.

SUMMARY OF THE INVENTION

According to a first aspect of the invention there is provided a method for synchronizing sound data and text data, said text data being obtained by manual transcription of said sound data during playback of the latter, comprising the steps of repeatedly querying said sound data and said text data to obtain a current time position corresponding to a currently played sound datum and a currently transcribed text datum, correcting said current time position by applying a time correction value in accordance with a transcription delay, and generating at least one association datum indicative of a synchronization association between said corrected time position and said currently transcribed text datum.

Here and in the following specification, the term "sound data" refers to audio data, e.g. human speech, that has been recorded and subsequently stored, preferably as a data file in a suitable digital data format, for subsequent manual transcription by a user (transcription), in particular a secretary who listens to the sound, which can be re-generated from the sound data, and who enters (types) text corresponding to the sound in the form of a stream of characters, typically by means of a keyboard. In this context, the term "sound datum" designates a segment of the sound data, the smallest possible sound datum being a single sound data bit.

Correspondingly, the term "text data" refers to text entered during the transcription session, i.e. a succession of characters, which is also preferably stored as a data file in a suitable digital data format. In this context, the term "text datum" designates a segment of the text data, the smallest possible text datum obviously being a single text data bit, i.e. a single text character.

The term "playback" refers to the act of generating a respective output corresponding to any one of the above-mentioned types of data, e.g. generating audible physical sound perceptible by the user from the sound data by means of a suitable output system, e.g. a sound card and an associated speaker system, or by displaying text corresponding to the text data on a display screen. During playback of the sound data, a given sound datum to be played corresponds to a "time position" in the sound data, i.e. the audio stream derived therefrom. For instance, the time position of a given sound datum could indicate the start time of said sound datum measured from the beginning of the audio stream.

Within the scope of the invention, the term "repeatedly" designates an action that is carried out a number of times, on an essentially regular basis, e.g. with a repetition frequency of 1 to 10 Hz (one query every 0.1-1 s). For instance, "querying" the sound data and the text data, respectively, is an exemplary action which is carried out repeatedly within the scope of the present invention, i.e. the sound data and the text data are frequently addressed during a transcription session to obtain a current audio time position and a recently entered text datum, respectively, as a query value wherein an actual length of the text datum depends on the querying frequency.

Further in this context, the term "correcting" refers to changing a query value by applying a predetermined correction value, e.g. subtracting a delay time value from a time position query value to obtain a corrected time position.

Finally, the term "association datum" in the present specification designates a segment of data, which contains/establishes an association between sound and text. Such a datum preferably contains information as to the sound time position at which a particular text datum should have been entered by the user to match the sound data perfectly thus creating a synchronization association between said text datum, e.g. a word or any succession of characters, and the sound data.

In this way, the invention method automatically achieves a close association between sound and text, in the case that sound is being transcribed manually. In other words: During manual transcription, according to the invention an association can be created between sound that has already been played back and text that is currently being entered, e.g. typed, based on the assumption that the text segment which is being entered at a given moment is closely related to the played sound as far as timing is concerned. This timing relation between played sound and entered text is governed predominantly by the transcription delay, which is due to the finite reaction speed of the transcriptionist.

By predetermining the transcription delay, i.e. the time correction value, in accordance with the transcription skill and/or typing speed of a user, i.e. the transcriptionist, the inventive method can easily be customized in order to provide satisfactory results for any kind of user, which uses the method for manually transcribing sound.

Advantageously, the time correction value takes the form of a time delay, i.e. a duration in time, corresponding to a "lag" of the user behind the sound when entering the transcription text. Such a delay time could easily be determined by playing back known sound data to the user prior to a transcription session and subsequently measuring and statistically processing the time it takes the user to enter the corresponding text data. The result could be stored in a system using the inventive method as a user profile for later utilization. As an alternative to the above-described approach, which requires user enrollment, it is conceivable to allow adjustment of the delay during synchronous playback and/or to manual correction of the association at the beginning and at the end of a transcribed section by the user, while interpolating the delay for the rest of the section.

In order to further improve synchronicity between the sound and the text, according to a further development of the inventive method characteristic speech-related information in said sound data, in particular pauses in said sound data corresponding to punctuation in said text data, are used for generating additional association data between time positions in said sound data corresponding to said speech related information and related text data. A typical example for such characteristic features would be speech pauses at the end of sentences, which correspond to a full stop or other punctuation characters in the transcribed text. In a preferred embodiment of the inventive method, said approach is part of the transcription delay computation logic. Pauses in the sound data are used to adjust the transcription delay, and based on this, compute corrected sound time positions related to the corresponding text.

According to a variant of the inventive method, said association data are stored together with said text data in a common synchronized text data file. In this way, storage of the association data, which may advantageously take the form of time stamps, i.e. numbers indicative of a time position in the sound data, e.g. elapsed time measured from the beginning of a corresponding sound data file, is achieved in analogy with transcriptions generated by means of a speech recognizer, such that in principle known synchronous playback methods/systems can be used to provide synchronous playback of the associated sound-text data, which are obtained in accordance with the inventive method.

Alternatively, if suitable for further data processing, said association data can be stored separately from said text data in a synchronization file.

According to a second aspect of the invention there is provided a method for synchronized playback of sound data and corresponding text data, comprising the steps of repeatedly playing back a respective sound datum at a given point of time, and showing a text datum associated with that sound datum at substantially said same point of time, said associated text datum being obtained in accordance with association data obtained according to any one of the above-described variants of the inventive synchronizing method. In this way, synchronous playback is readily available even when transcribing sound manually, e.g. for correction purposes.

According to a third aspect of the invention there is provided a system for synchronizing sound data and text data, comprising:
  sound input means for providing said sound data, in particular in the form of human speech,
  storage means for storing said sound data,
  playback means for playing back said sound data to a user,
  input means for manual transcription of said sound data by input of said text data, and
  data processing means for creating association data indicative of a synchronization association between said sound data and said text data, said data processing means comprising:
  query means for repeatedly querying said sound data and said text data to obtain a current time position corresponding to a currently played sound datum and a currently entered text datum,
  correcting means for correcting said current time position by applying a time correction value in accordance with a transcription delay, and
  data generating means for generating an association datum indicative of a synchronization association between said corrected time position and said currently entered text datum.

Such a system is particularly suited for translating into action the inventive method according to the first aspect of the invention as described above.

In another embodiment of the inventive system said data processing means is adapted for identifying characteristic speech related information in said sound data, in particular pauses in said sound data corresponding to punctuation in said text data, and for improving the time correction value in accordance with corresponding time positions in said sound data and related text data. This helps to further improve synchronicity between the sound and the text, for instance by generating an additional association datum linking a speech pause at the end of a phrase to a corresponding punctuation character entered in temporal vicinity thereto, e.g. a full stop or a comma.

In order to be compatible with known realizations of synchronous playback the inventive system may be devised such that said association data are stored together with said text data in a common synchronized text data file, as is generally the case in known systems, which rely on speech recognition for generating text data. This is of particular interest since it allows mixing of recognized and transcribed text in a single document, e.g. if a speech recognizer could not process a longer section of sound data which therefore had to be transcribed manually. However, for full flexibility of realization said association data can alternatively be stored separately from said text data in a synchronization file.

According to a fourth aspect of the invention there is provided a system for synchronized playback of sound data and corresponding text data, comprising playback means for playing back a respective sound datum at a given point of time, and showing means for showing a text datum associated to that sound datum at substantially said same point of time, wherein the system further comprises a sub-system according to any one of the above-described variants of the inventive system for synchronizing sound data and text data. By this means, the inventive system according to said fourth aspect of the invention can easily incorporate a synchronous playback feature even when transcribing sound manually, e.g. for correction purposes.

The synchronized playback system according to said fourth aspect of the invention is particularly useful for the transcription of sound to text, in particular for medical transcription.

More generally, the synchronized playback system according to said fourth aspect of the invention is particularly useful as part of a correction stage in a document creation workflow, the latter comprising at least the stages of dictation, speech recognition, and correction, optionally a further stage of review/quality assurance. Further advantages and characteristics of the present invention can be gathered from the following description of a preferred embodiment with reference to the enclosed drawings. The features mentioned above as well as below can be used in accordance with the invention either individually or in conjunction. The embodiments mentioned are not be understood as an exhaustive enumeration but rather as examples with regard to the underlying concept of the present invention.

BRIEF DESCRIPTION OF THE DRAWINGS

FIG. 3 is an exemplary common synchronized text data file, in which association data are stored together with text data in consistence with the present invention;

DETAILED DESCRIPTION

Figure 1:
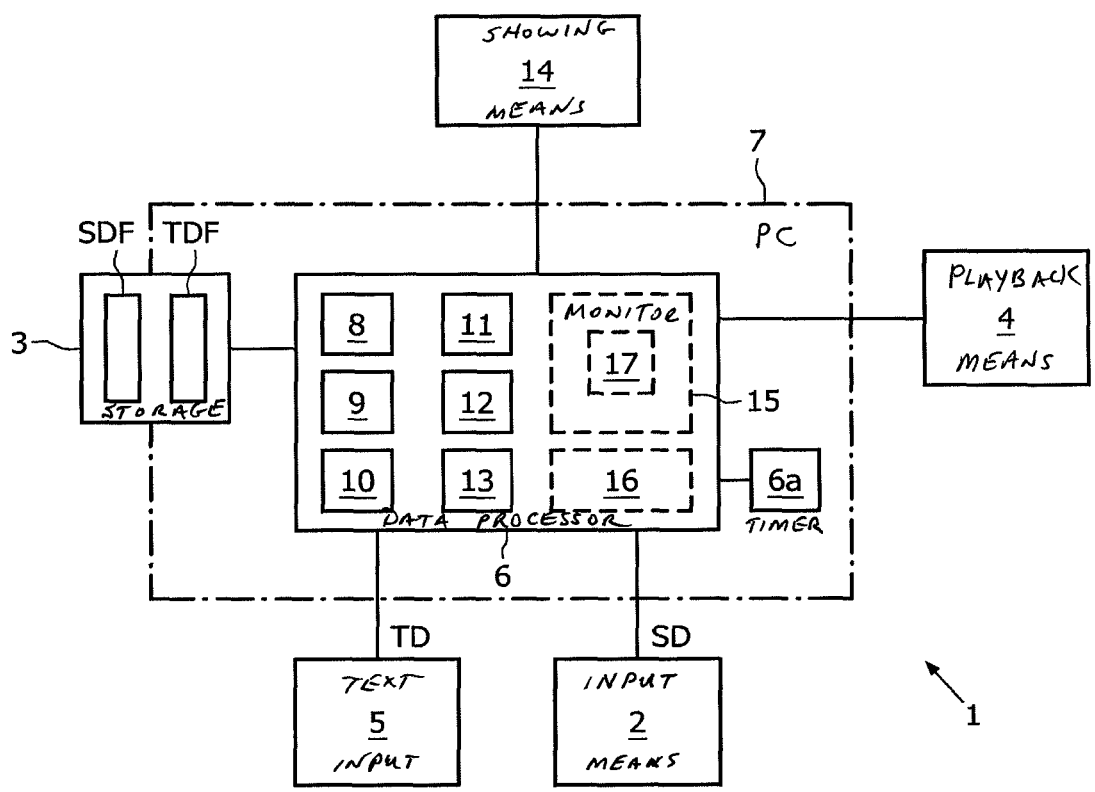
FIG. 1 is a schematic block diagram of a system for synchronized playback of sound data and corresponding text data consistent with the present invention.

The following detailed description of the invention refers to the accompanying drawings. The same reference numerals may be used in different drawings to identify the same or similar elements.

FIG. 1 shows a block diagram of a system 1 for synchronized playback of sound data and corresponding text data consistent with the present invention. The system 1 for synchronizing sound data and text data comprises sound input means 2 for providing said sound data, in particular in the form of human speech, e.g. in the form of a microphone together with any necessary driver electronics. However, the sound data could also be provided in a different way, e.g. on a portable data carrier such as a CD-ROM or via internet, in which case the input means 2 would take on a corresponding suitable form, i.e. a CD-ROM drive and an internet connecting means, respectively. The system 1 further comprises storage means 3 for storing said sound data SD as a sound data file SDF of any suitable data format. Based on the specific system requirements the storage means 3 can be either of volatile or of non-volatile type, as known to a person skilled in the art. The inventive system 1 also includes playback means 4 for playing back said sound data to a user, which in the shown embodiment takes the form of an audio speaker system together with any necessary driver electronics. For the manual transcription of said sound data the system 1 according to the invention further comprises text input means 5 in the form of a keyboard by means of which said text data can be provided by a user, i.e. a transcriptionist, who listens to the audio signal derived from the sound data and types the corresponding text using the characters provided by the keyboard.

In order to be able to perform the specific actions defined above, all of the aforementioned system components 2-5 are connected to a central control unit in the form of data processing means 6, e.g. a microprocessor, including at least one timer unit 6a. In this way, the inventive system 1 is preferably devised as a PC-based system 7 as indicated by the dash-dotted box in FIG. 1. The above-mentioned system components 2-5 accordingly take the form of peripheral units connected to the PC system 7 by means of suitable interfaces (not shown in detail). As also indicated in FIG. 1, the storage means 3 can either be arranged internally or externally with respect to the PC system 7.

According to the basic concept of the invention, for creating association data indicative of a synchronization association between said sound data and said text data, said data processing means 6 comprise query means 8 for repeatedly querying said sound data SD and said text data to obtain a current time position corresponding to a currently played sound datum and a currently entered text datum. Furthermore, the data processing means 6 comprise correcting means 9 for correcting said current time position by applying a time correction value in accordance with a transcription delay, and data generating means 10 for generating an association datum indicative of a synchronization association between said corrected time position and said currently entered text datum. The aforementioned components 8-10 of the data processing means 6 are preferably implemented in software form. In this context the data processing means with reference to FIG. 1 further comprise a program execution means 11 for executing and coordinating at least the software components 8-10. The operation of the inventive system 1 described so far will be explained in detail below with reference to FIG. 2.

Text data TD entered by means of the input means 5 can also be stored in the storage means 3, preferably together with said association data (see below), as a text data file TDF. An exemplary file format will be explained below with reference to FIG. 3. Furthermore, the system 1 also comprises a data buffer 12, in particular for buffering entered text data TD and/or time position data (cf. FIG. 2) prior to their storage in said storage means 3, as well as speech recognition means 13 arranged as a software module within the data processing means 6, the use of which will become apparent later.

For synchronized playback of sound data SD and corresponding text data TD, the system 1 in addition to the audio playback means 4 for playing back the sound data SD, i.e. a respective sound datum at a given point of time, also comprises showing means 14 in connection with the data processing means 6 for showing a text datum associated to a sound datum that is being played back at substantially the same point of time, thus achieving said synchronous playback. Said showing means 14 advantageously take the form of a standard PC display screen, on which said text datum can be shown either be simply writing it on the screen or by highlighting it, or the like. In this way, by successively playing back the whole contents of the sound data file, the entire corresponding transcription text data TD is displayed in synchronous fashion.

Optionally, the system 1 according to the invention, i.e. the data processing means 6, further comprises monitoring means 15, 16, e.g. a sound data level monitor 15 comprising a timer 17, and a text input monitor 16, illustrated with dashed lines in FIG. 1. The inventive use of the monitoring means 15, 16 will become apparent later.

Figure 2:
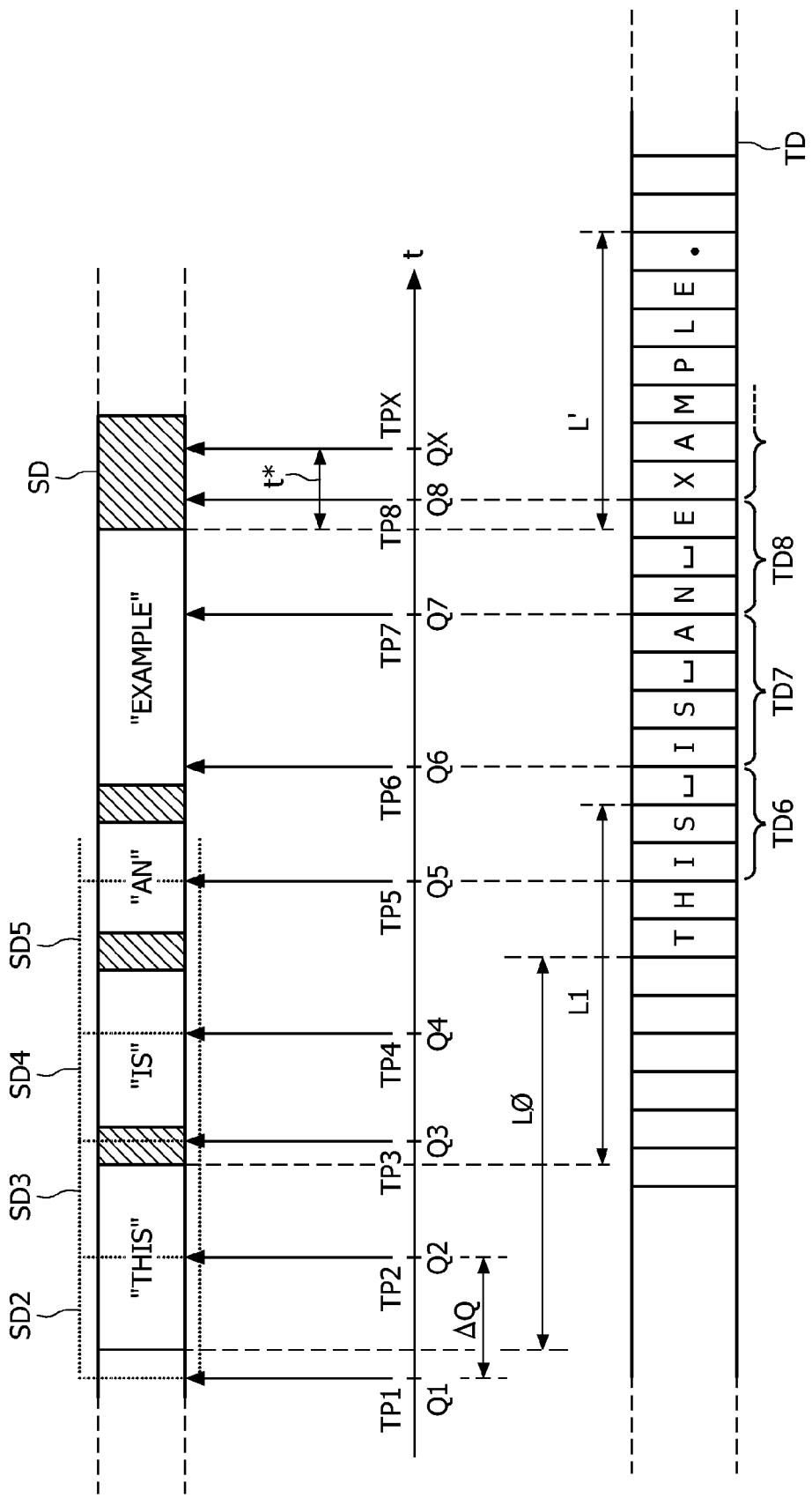
FIG. 2 is a diagram illustrating the inventive method for synchronizing sound data and text data.

FIG. 2 shows exemplary sound data SD and corresponding transcription text data TD ("This is an example.") in the form of data streams, i.e. as a temporal succession of sound segments (each of them referred to as an individual sound datum denoted SDi, wherein i is an integer greater than zero) and input characters (grouped in a respective text datum TDj, wherein j is an integer greater than zero), respectively, during a typical manual transcription session. The horizontal axis t denotes time. The sound data SD is depicted in the upper half of FIG. 2 whereas the text data TD is shown in the lower half of FIG. 2. Individual sound segments are marked with dotted boxes. Hatched areas in the sound data SD stream denote times at which the sound signal level drops below a predetermined value, thus indicating a pause in the sound data, e.g. between words or at the end of a sentence. However, pauses between words are usually not detectable in continuous speech, therefore the hatched areas between words practically tend to zero and are only depicted for reasons of completeness. The text data TD input stream is graphically subdivided into small segments, each of which contains a single text input character, e.g. the letter "T" or the space character "_". Although said segments are all depicted as being roughly of equal size, i.e. length in time, substantial variation is possible, as the transcriptionist may require a longer time for entering certain characters, e.g. a Greek letter such as "$\alpha$", compared with standard Latin characters, e.g. the letter "a".

According to the invention, both the sound data SD and the entered text data TD are repeatedly queried, preferably on a regular temporal basis, by means of the query means 8 (FIG. 1). In FIG. 2, the query times are denoted Qi, wherein i is an integer greater than zero, and are marked on the time axis t. A time interval AQ between successive queries preferably amounts to about 0.1-1 s. As an alternative to using a fixed time interval AQ, queries can also be triggered by certain text such as white space or punctuation to obtain better association of sound and text at word boundaries. In this way it is possible to obtain a current time position TPi, wherein I is an integer greater than zero, corresponding to a currently played sound datum SDi and a currently entered text datum TDj, respectively. Obtaining said time position TPi is illustrated by means of vertical arrows pointed toward the sound data SD in FIG. 2. The arrow locations are further used to define the time boundaries of the individual sound segments SDi. A currently entered text datum TDj is defined as a group of characters that were entered after the previous query time Qi-1 and up to the current query time Qi, e.g. TDj=at Qi, i=7. Reference numerals TD and SD are indexed with different index variables i, j because of a time lag between the sound data SD and the text data TD which occurs during a manual transcription session and which will be explained in detail below. In this way, a currently entered text datum TDj as defined above does generally not correspond to a currently played sound datum SDi as far as their respective contents are concerned.

Due to the finite hearing and reaction speed of the transcriptionist, the text data TD generally lags behind the sound data SD as illustrated in FIG. 2: The time lag L of the transcription is not a static value but varies in the course of the transcription session. For instance, there is a certain lag L0 before the transcriptionist starts typing the word "This", which corresponds to one or several sound segments that were played back earlier. A time lag L1 corresponding to the time it takes before the transcriptionist finishes entering the word "This" after the corresponding sound has been played back will generally differ from the aforementioned time lag L0. Additionally, the time lag may become more pronounced during acoustically difficult sound passages or toward the end of a long transcription session due to a lack of concentration. Nevertheless, it is possible to derive at least an average time lag L, which will depend on the transcription ability of the system user, i.e. $L1 \leq L \leq L0$ for the example given in FIG. 2. A user dependent value for said time lag L is preferably entered prior to a transcription session into the system, e.g. by means of the text input means 5, where it may be stored in connection with a user profile as known to a person skilled in the art. Alternatively, said time lag value may be derived dynamically by the inventive system, e.g. by means of the data processing means 6 measuring transcription speed during user enrollment (as mentioned above), or by determining a time between the beginning of sound data playback and entering the first corresponding text datum, and setting the value of L to said measured/determined time lag. However, the aforementioned initial delay is normally not a very good estimate for L, thus said first alternative is preferred.

In order to create an association between the sound data SD and the entered text data TD for later synchronous playback by the inventive system 1 (FIG. 1) despite the aforementioned time lag L, the time position information that was initially derived for a currently entered text datum TDj by querying the sound data SD must be time corrected to account for the lag L between sound data SD and text data TD:

According to the invention, a currently entered text datum TDj, e.g. text datum TD7="is . . . a" at Q7, is stored in the data buffer 12 (FIG. 1) and approximately associated with a corresponding earlier played sound datum, e.g. SD5, by correcting the current time position TP7 in said correcting means 9 (FIG. 1) by subtracting the time lag L, i.e. TP7'=TP7−L, thus applying a time correction value in accordance with a transcription delay. The text datum TD7 and the corrected time position TP7', which at least approximately corresponds to the actual time position of the sound datum most closely related to said text datum TD7, are then appended to the text data file TDF (FIG. 1) by means of the data generating means 10 (FIG. 1), thus generating an association datum <TPT> (cf. FIG. 3) indicative of a synchronization association between said corrected time position TP7' and said currently entered text datum TD7.

Figure 3:
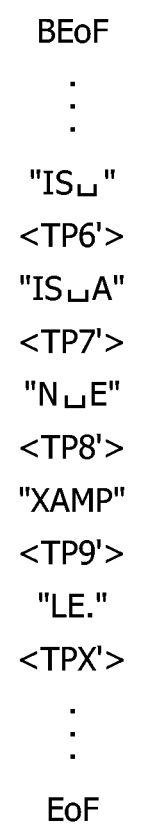

FIG. 3 shows an exemplary excerpt from a common synchronized text data file TDF (FIG. 1) corresponding to the example illustrated in FIG. 2 in which said association data are stored together with said entered text data in the storage means 3 (FIG. 1) after buffering and time correction in the data processing means 6 (FIG. 1). BEOF and EOF denote the beginning and the end of the text data file TDF, respectively. The individual data segments TDj are marked " . . . ". Following each text datum TDj, the file comprises the corresponding corrected time position TPi' in the form of an association datum <TPi'>, which can be used during joint playback of the sound and text data to provide synchronization of the respective output data. This will be explained below with reference to FIG. 5.

In order to further improve the synchronicity between sound data and text data characteristic speech related information in the sound data, in particular pauses in the sound data which correspond to punctuation in the text data, are used for generating additional association data between time positions in the sound data corresponding to said speech related information and related text data. To this end, according to a variant of the inventive system 1, the sound data level monitor 15 (FIG. 1) continuously monitors a level of the sound data SD during playback in the context of a manual transcription session in order to detect data segments which are representative of speech pauses in the sound data (cf. the hatched area at the end of the example sentence in FIG. 2). Whenever the sound level drops below a predetermined threshold value, which can be supplied by the user, a timer 17 comprised in said level monitor 15 is reset and started. If said timer 17 reaches another predetermined value t* (cf. FIG. 2) before the sound level regains a value higher than said threshold value, an extra query is made to obtain a current time position TPX of the sound data, which is buffered in said data buffer 12 (FIG. 1). Said extra query is denoted QX in FIG. 2. Well-known "voice operated recording" functionalities (as also used for speech recognition) of the sound driver can be used to detect pauses in the audio, i.e. the driver notifies that there was a pause of x milliseconds at a time-position y. As such a pause generally corresponds to —or rather follows, i.e. occurs in connection with—a punctuation in the text data, e.g. a comma, a full stop, a question mark, or an exclamation mark, as soon as a subsequent text input datum TDj comprises such a punctuation character, such as the full stop shown in FIG. 2, the corrected time position TPf=TPj−L should be close (<is time difference) to TPX. If this is not the case, it is assumed that the detected pause is not related to the punctuation but rather to irregularities in human speech, and is therefore ignored. If TPf is close to TPX however, an improved estimate for the average transcription delay L can be computed by using L=ABS(TPj−TPX). Furthermore, an additional association datum <TPX'>between the time position of the pause and the related text datum TDj is generated and stored in the text data file TDF (cf. FIG. 3).

In this way, the level monitor 15 (FIG. 1) can be used for readjusting the transcription lag L. To this end it is assumed that the time value provided by the timer 17 at the time of occurrence of the punctuation character (provided by text input monitor 16) essentially corresponds to the actual lag L' of the transcription input behind the playback of the corresponding sound datum. Thus, for readjusting the transcription lag L, its value is set to the value of the actual lag L', i.e. the corresponding value provided by timer 17.

Figure 4:
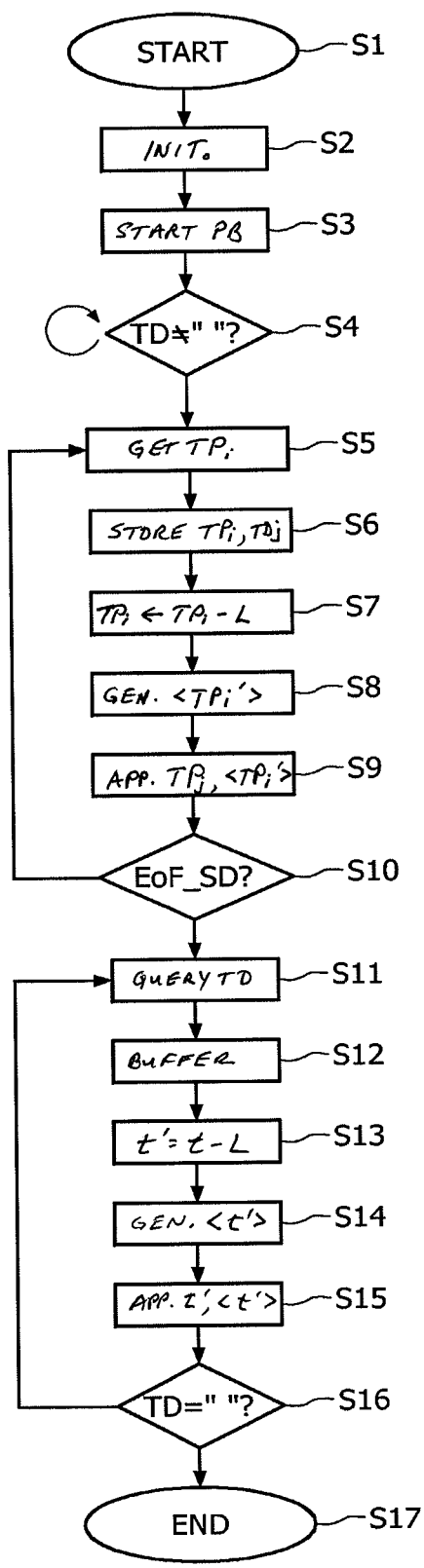
FIG. 4 is a flow chart further illustrating the inventive method for synchronizing sound data and text data.

FIG. 4 shows a flow chart illustrating the inventive method for synchronizing sound data and text data, said text data being provided by manual transcription of said sound data. Assuming that sound data, in particular in the form of human speech, has been provided via said sound input means 2 (FIG. 1) and stored in said storage means 3 (FIG. 1) for playback, the inventive method is started in step S1, which is followed by an initialization of the system in step S2, including resetting (t=0) and starting the timer 6a as well as setting the time correction/delay value L and additional threshold values (e.g., t*, see above), optionally by requesting a user input. Furthermore, a text data file TDF (FIG. 1) for storing the transcription text data to be entered by the user is opened in the storage means 3. Playback of the audio stream corresponding to the sound data is started in step S3 and will continue without interruption until an end of the sound data file SDF (FIG. 1) is reached (step S10, see below) or playback is explicitly interrupted by the user. In subsequent step S4 the system waits until the user first enters text data, i.e. TD≠"", corresponding to the sound data that is being played back. After that, the following steps S5-S9 are repeated until reaching the end of the sound data file SDF is detected in step S10. In step S5 both the sound data and the text data are queried to obtain a current time position TPi corresponding to a currently played sound datum SDi and a currently transcribed text datum TDj, respectively. In subsequent step S6 both the obtained time position TPi and the text datum TDj, i.e. a string of characters, are temporarily stored in the data buffer 12 (FIG. 1). Step S7 involves correcting said current time position TPi by subtracting the time correction value L in accordance with a transcription delay, and in subsequent step S8 at least one association datum <TPi'> is generated, which is indicative of a synchronization association between said corrected time position TPi' and said currently transcribed text datum TPj. Finally, in step S9 the text datum TPj and the corresponding association datum <TPi'> are appended to the text data file TDF, as has already been described above with reference to FIG. 3. After that, subsequent steps S11-S15 comprise actions similar to those described with reference to steps S5-S9, the major difference being that only the text data is queried in step S11, since playback of the sound data has already been terminated. Time position information, however, can still be derived at least approximately from the system timer 6a, which had been reset just prior to starting the sound data playback. Accordingly, in step S12 the timing information t provided by said timer 6a is buffered together with the text datum, and in step S13 said timing information t is corrected thus yielding t'=t−L, as described above. Steps S14 and S15 correspond to the previous steps S8 and S9, wherein TPi' and <TPi> have to be substituted with t' and <t'>, respectively. If the end of user input is detected in step S16, the inventive method ends in subsequent step S17.

Figure 5:
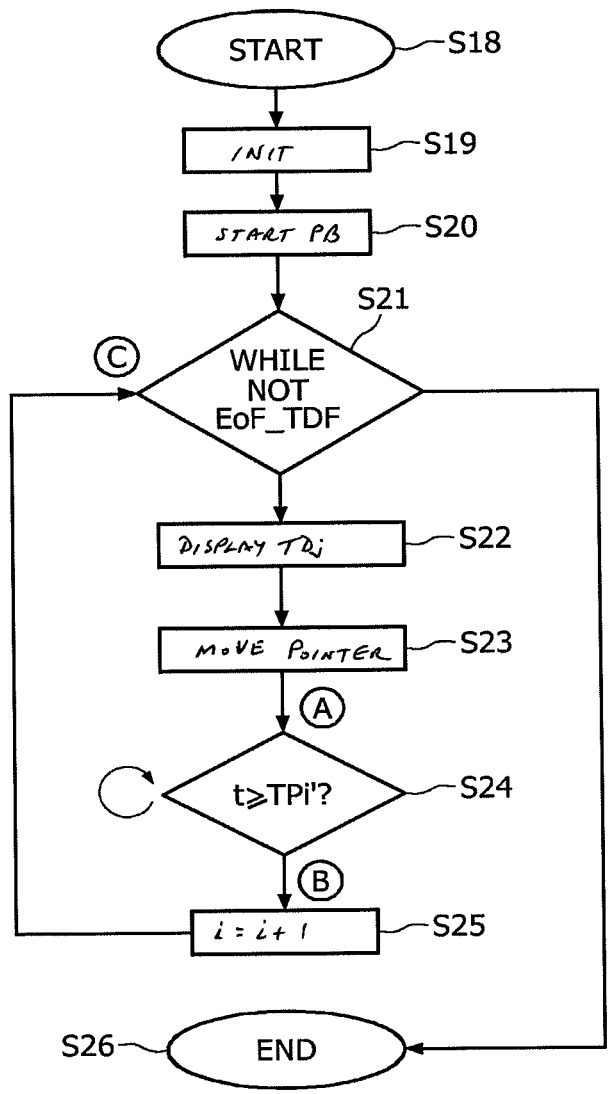
FIG. 5 is a flow chart illustrating the inventive method for synchronized playback of sound data and corresponding text data.

FIG. 5 shows a flow chart illustrating the inventive method for synchronized playback of sound data and corresponding text data, which makes use of the synchronized text data file TDF (FIGS. 1, 3) obtained through the inventive method described above with reference to FIGS. 2 and 4. Said method for synchronized playback of sound data and corresponding text data is started in step S18. Subsequent step S19 is an initialization step, in particular for resetting (t=0) and starting the system timer 6a, and for allocating a text pointer to the beginning of the text data file TDF (FIG. 3), the latter comprising the transcription text data to be shown in synchronous fashion together with the sound data. In subsequent step S20 playback of the sound data is started. Immediately afterwards, while the end of the text data file TDF has not yet been reached (detection step 21), in step S22 a first text data segment TDj is shown, e.g. displayed on the showing means 14. As described with reference to FIGS. 2 and 3, said first text data segment TDj comprises all of the text data preceding the first corresponding association datum <TPi'>, which would be <TP5'> for the example given in FIG. 2. If said text data segment TDj ends in the middle of a lexical unit, such as a word (cf. FIG. 2), said data segment can be extended to include part of the next text data segment TDj+1 until reaching a "_" (space) character, which indicates the end of a lexical unit. In this way, the inventive method provides enhanced perceptibility of the synchronous data output. Additionally, the text output could be structured using other known lexical features, e.g. syllables or the like. In a following step S23 the text pointer is moved to the current position in the text data file TDF, such that a subsequent output will start with the first character of transcribed text which has not yet been shown during the previous output step S22. After that, in step S24 the inventive systems waits for the system timer 6a to reach a value t≥<TPi'>, i.e. the elapsed time since system initialization has passed the time corresponding to said first association datum. In a subsequent step S25, the index variable i is incremented, and the method continues with step 21. Steps S21 to S25 are repeated until all of the transcribed text has been shown (step S26). As an improved alternative to step S24 described above, instead of using the system timer 6a a current time position for controlling the text output could be obtained as before by directly querying the sound data during playback (cf. FIGS. 2, 4), thus linking the sound and text outputs in an even more direct manner: In this context either the current sound position is queried periodically or the sound driver sends periodical events indicating the current sound position. Said sound position is used for selecting the text datum which is to be shown. During synchronous playback, text is usually displayed in a text processor, such as MS-Word, and than the relevant parts are highlighted.

The inventive system 1 (FIG. 1) can be used in a general way for the transcription of sound to text, in particular for medical transcription. Advantageously, the system 1 is included as part of a correction stage in a document creation workflow, the latter comprising at least the stages of:

dictation, e.g. recording sound data by means of suitably adapted sound input means 2 (FIG. 1), e.g. in the form of a microphone, and subsequent storage of the sound data in the storage means 3;

speech recognition by means of the speech recognition means 13 (FIG. 1) to automatically produce text data; and correction of said automatically produced text data by manual re-transcription of faulty passages in said text data according to the inventive methods.

Optionally a further stage of review/quality assurance can be provided, which may also make use of the inventive methods described in detail above.

The invention claimed is:

1. A method for synchronizing recorded sound data (SD) and text data (TD), said text data (TD) being obtained by manual transcription of said recorded sound data (SD) during playback of the latter, the method comprising:

repeatedly and substantially continuously during said playback performing the steps of:

querying, via a computer executing stored program instructions, said recorded, played back sound data (SD) and said text data (TD) to obtain at a current time position (TPi) a corresponding currently played sound datum (SDi) and a currently transcribed text datum (TDj), generating, via a computer executing stored program instructions, for the TDj, a corrected time position (TPi') by applying a time correction value (L) in accordance with a transcription delay to the current time position (TPi), generating via a computer executing stored program instructions at least one association datum (<TPi'>) indicative of a synchronization association between said corrected time position (TPi') and said currently transcribed text datum (TDj), and in response to identifying a pause in said sound data (SD) that corresponds to punctuation in said text data (TD), generating an additional association datum (<TPX'>).

2. The method according to claim 1, wherein said association data (<TPi'>, <TPX'>) are stored together with said text data (TD) in a common synchronized text data file (TDF).

3. The method according to claim 1, wherein said association data (<TPi'>, <TPX'>) are stored separately from said text data (TD) in a synchronization file.

4. A method for synchronized playback of sound data (SD) and corresponding text data (TD), comprising the steps of repeatedly:

playing back a respective sound datum (SDi) at a given point of time (t), and showing a text datum (TDj) associated with that sound datum (SDi) at substantially said same point of time (t), wherein the associated text datum (TDj) is obtained by the method according to claim 1.

5. The method according to claim 4, wherein the text datum (TDj) corresponding particular pauses in said sound data (SD) corresponding to punctuation in said text data (TD), is shown at essentially a point of time (t) at which the sound data (SD) meets a predetermined criterion indicative of said pauses.

6. The method of claim 1, wherein the steps of the method are performed repeatedly and substantially continuously at intervals on the order of about 0.1-1 second.

7. The method of claim 1, wherein the additional association datum (<TPX'>) represents a time position (TPX') associated with the identified pause.

8. A system for synchronizing sound data (SD) and text data (TD), comprising:

sound input means for providing said sound data (SD), in particular in the form of human speech;

storage means for storing said sound data (SD);

playback means for playing back said sound data (SD) to a user;

text input means for manual transcription of said sound data (SD) by providing said text data (TD); and data processing means for creating association data (<TPi'>, <TPX'>) indicative of a synchronization association between said sound data (SD) and said text data (TD), said data processing means comprising:

query means for repeatedly and substantially continuously querying said sound data (SD) and said text data (TD) to obtain at a current time position (TPi) a corresponding currently played sound datum (SDi) and a currently entered text datum (TDj), correcting means for, repeatedly and substantially continuously generating, for the TDj, a corrected time position (TPi') by applying a time correction value (L) in accordance with a transcription delay to the current time position (TPi), and data generating means for, repeatedly and substantially continuously generating an association datum (<TPi'>) indicative of a synchronization association between said corrected time position (TPi') and said currently entered text datum (TDj), wherein said data processing means are adapted for identifying pauses in said sound data (SD) corresponding to punctuation in said text data (TD), and for generating additional association datum (<TPX'>).

9. The system according to claim 8, wherein said association data (<TPi'>, <TPX'>) are stored together with said text data (TD) in a common synchronized text data file (TDF).

10. The system according to claim 8, wherein said association data (<TPi'>, <TPX>) are stored separately from said text data (TD) in a synchronization file.

11. The system according to claim 8, further for synchronized playback of sound data (SD) and corresponding text data (TD), comprising:

playback means for playing back a respective sound datum (SDi) at a given point of time (t), and showing means for showing a text datum (TDj) associated to that sound datum (SDi) at substantially said same point of time (t).

12. The system according to claim 11, wherein said data processing means (6) are adapted for identifying pauses in said sound data (SD) corresponding to punctuation in said text data (TD), and for commanding said showing means to show a respective text datum (TDj) corresponding to a said pause at essentially a point of time (t) at which said sound data (SD) meets a predetermined criterion indicative of said pause.

13. A method comprising using the system according to claim 12 for the transcription of sound to text, in particular for medical transcription.

14. A method comprising using the system according to claim 12 as part of a correction stage in a document creation workflow, the latter comprising at least the stages of:
dictation,
speech recognition, and
correction.

15. The system of claim 8, wherein:
the query means repeatedly and substantially continuously queries said sound data (SD) and said text data (TD) at intervals on the order of about 0.1-1 second;
the correcting means repeatedly and substantially continuously generate the corrected time position (TPi') at intervals on the order of about 0.1-1 second; and
the data generating means repeatedly and substantially continuously generate the association datum (<TPi'>) at intervals on the order of about 0.1-1 second.

16. The system of claim 8, wherein the additional association datum (<TPX'>) represents a time position (TPX') associated with the identified pause.

* * * * *